(12) United States Patent
Ota

(10) Patent No.: US 10,935,323 B2
(45) Date of Patent: Mar. 2, 2021

(54) STRUCTURE JOINED BY NICKEL BRAZING

(71) Applicant: T.RAD Co., Ltd., Tokyo (JP)

(72) Inventor: Hiromi Ota, Tokyo (JP)

(73) Assignee: T.RAD CO., LTD., Tokyo (JP)

( * ) Notice: Subject to any disclaimer, the term of this patent is extended or adjusted under 35 U.S.C. 154(b) by 9 days.

(21) Appl. No.: 16/466,573

(22) PCT Filed: Dec. 20, 2017

(86) PCT No.: PCT/JP2017/047145
§ 371 (c)(1),
(2) Date: Jun. 4, 2019

(87) PCT Pub. No.: WO2018/124253
PCT Pub. Date: Jul. 5, 2018

(65) Prior Publication Data
US 2020/0072556 A1    Mar. 5, 2020

(30) Foreign Application Priority Data
Dec. 26, 2016  (JP) .............................. JP2016-250564

(51) Int. Cl.
*F28F 3/08*    (2006.01)
*F28D 9/00*    (2006.01)
(Continued)

(52) U.S. Cl.
CPC ............... *F28D 9/005* (2013.01); *B23K 1/00* (2013.01); *B23K 1/19* (2013.01); *F28F 3/027* (2013.01); *F28F 9/0246* (2013.01); *F28F 21/08* (2013.01); *B23K 35/3033* (2013.01); *B23K 2103/05* (2018.08); *F28D 2021/0089* (2013.01); *F28F 2275/04* (2013.01)

(58) Field of Classification Search
CPC ... F28D 9/005; F28D 2021/0089; B23K 1/00; B23K 1/19; B23K 2103/05; B23K 35/3033; F28F 3/027; F28F 9/0246; F28F 21/08; F28F 2275/04
USPC ........................................................ 165/167
See application file for complete search history.

(56) References Cited

U.S. PATENT DOCUMENTS 4,839,242 A * 6/1989 Murayama ........... B23K 35/005
428/660
5,050,790 A * 9/1991 Takikawa ................. B01J 35/04
228/181

(Continued)

FOREIGN PATENT DOCUMENTS

JP    55-103297 A    8/1980
JP    60-158820 A    8/1985
(Continued)

*Primary Examiner* — Davis D Hwu
(74) *Attorney, Agent, or Firm* — Norris McLaughlin, P.A.

(57) ABSTRACT

A multi-plate oil cooler with high joining strength with an inner fin while suppressing a usage amount of a nickel brazing filler, even when ferrite-based stainless steel with low wettability for a nickel brazing filler is used for a plate is provided. A plate made from a ferrite-based stainless steel plate and an inner fin made from a pure iron plate or a carbon steel plate are joined with a nickel brazing filler to form a multi-plate oil cooler. In general, a structure body is provided wherein a ferrite-based stainless steel and pure iron or a carbon steel are joined with a nickel brazing filler.

1 Claim, 4 Drawing Sheets

(51) Int. Cl.
*B23K 1/00* (2006.01)
*B23K 1/19* (2006.01)
*F28F 3/02* (2006.01)
*F28F 9/02* (2006.01)
*F28F 21/08* (2006.01)
*B23K 103/04* (2006.01)
*B23K 35/30* (2006.01)
*F28D 21/00* (2006.01)

(56) References Cited

U.S. PATENT DOCUMENTS

| | | | | |
|---|---|---|---|---|
| 2002/0050342 | A1* | 5/2002 | Gerstmann | F28D 7/026 165/109.1 |
| 2005/0116208 | A1* | 6/2005 | Watsuji | B23K 35/3613 252/512 |
| 2006/0112693 | A1 | 6/2006 | Sundel | |
| 2011/0250465 | A1* | 10/2011 | Rozen | C22C 9/00 428/595 |
| 2013/0048257 | A1* | 2/2013 | Perry | F28D 7/106 165/154 |
| 2015/0027679 | A1* | 1/2015 | Singh | B23K 1/008 165/182 |
| 2015/0330719 | A1 | 11/2015 | Aul et al. | |
| 2018/0037968 | A1 | 2/2018 | Hiraide et al. | |

FOREIGN PATENT DOCUMENTS

| | | |
|---|---|---|
| JP | 63-79611 A | 4/1988 |
| JP | 1-289593 A | 11/1989 |
| JP | 2004-202547 A | 7/2004 |
| JP | 2008-522081 A | 6/2008 |
| JP | 2012-251673 A | 12/2012 |
| JP | 2014-30830 A | 2/2014 |
| JP | 2015-045427 A | 3/2015 |
| JP | 2015-219005 A | 12/2015 |
| JP | 2017-100148 A | 6/2017 |
| WO | 2016/152854 A1 | 9/2016 |

\* cited by examiner

STRUCTURE JOINED BY NICKEL BRAZING

TECHNICAL FIELD

The present invention relates to a structure body joined with a nickel brazing filler, which is optimum mainly for multi-plate oil coolers.

BACKGROUND ART

As one example, there is known a multi-plate one in which a plurality of plates formed in a dish shape are stacked and an oil flow path and a cooling water flow path are alternately arranged for every other plate. Then to the oil flow path, an inner fin is arranged, to improve a heat transfer property on the oil side. For the plate, an austenite-based stainless steel such as SUS304 or SUS316, or a ferrite-based stainless steel such as SUS430 is used, and respective plates are brazed with a copper brazing filler.

CITATION LIST

Patent Literature

PTL 1: Japanese Patent Application Laid-Open Publication No. 2015-045427

SUMMARY OF INVENTION

Technical Problem

However, when joining is performed with a copper brazing filler as an oil cooler for cooling a lubricating oil of an engine, gear box and the like, following problems occur.

From the copper brazing filler inside an engine through which oil circulates, Cu ions elute into the oil, and these Cu ions react with sulfur-based additives in the oil to form copper sulfide. A phenomenon, in which sludge accumulation occurs near a sliding portion or in a sealing portion as a consequence of the generation reaction of copper sulfide to cause oil leak, has been confirmed, and in order to prevent this, reduction of the use of a copper brazing filler is demanded.

As one of measures, it is considered to use a nickel brazing filler and to configure a multi-plate oil cooler, in place of a copper brazing filler. However, the change of a brazing material from a copper brazing filler to a nickel brazing filler in this way causes no problem in a case of expensive austenite-based stainless steel containing nickel, but it is confirmed that, in a case of a chrome-based ferrite-based stainless steel, spread of a nickel brazing filler deteriorates extremely and, consequently, disconnection of the brazing filler occurs to generate an unjoined portion.

If it is tried to deal with this by increasing an amount of a brazing material, in particular, in a joining portion with an inner fin on the oil flow path side, the contact area between the fin and a plate is extremely broad, and therefore the usage amount of the nickel brazing filler increases significantly. Moreover, simple increase in the amount of a brazing material causes such trouble that an oil thin flow path of the inner fin is blocked with the brazing material.

Consequently, the present inventor has found according to various experiment conditions under which a nickel brazing filler spreads sufficiently even when a comparatively inexpensive ferrite-based stainless steel is used. On the basis of this, the present invention aims at providing multi-plate oil coolers and the like with high joining strength by optimizing the combination of various material qualities of an oil cooler, while suppressing the usage amount of an expensive nickel brazing filler.

Solution to Problem

The first aspect of the present invention is a structure body wherein a ferrite-based stainless steel, and pure iron or a carbon steel are joined with a nickel brazing filler.

The second aspect of the present invention is the structure body according to the first aspect, wherein the structure body is a heat exchanger in which a plate 3 made from a ferrite-based stainless steel plate and an inner fin 10 made from a carbon steel plate are joined with a nickel brazing filler.

The third aspect of the present invention is the structure body according to the second aspect, wherein the heat exchanger is an oil cooler of a multi-plate type in which an oil flow path 5 and a cooling water flow path 6 are arranged alternately, and the inner fin 10 is arranged to the oil flow path 5.

Advantageous Effects of Invention

According to the invention described in claim 1, by joining a ferrite-based stainless steel, and pure iron or a carbon steel with a nickel brazing filler, the spread of a brazing material that is melt in brazing becomes large, and reliable joining with large joining strength can be performed.

In other words, heretofore, if it is tried to join ferrite-based stainless steels each other with a nickel brazing filler, the spread of the brazing filler is extremely low and therefore an unjoined portion might occur due to disconnection of the brazing filler. In order to prevent the disconnection of the brazing filler, a more amount of brazing material was demanded.

In contrast, as in the present invention, as a consequence of the combination of a ferrite-based stainless steel, and pure iron or a carbon steel in nickel brazing, the spread of the brazing material becomes large due to high wettability of the pure iron or carbon steel, to prevent the occurrence of unjoined portion due to disconnection of the brazing filler. Furthermore, since a small amount of brazing material can braze the two, the cost of the brazing material is reduced. Moreover, since an excess part of the brazing material does not stay, even in joining of fine parts, clogging due to the brazing material does not occur in flow paths between parts.

The fact that pure iron and carbon steel have high wettability relative to a nickel brazing filler has been found by the present inventor through experiments, which is based on that pure iron and carbon steel transform from a body-centered cubic structure to a face-centered cubic structure at 800-900° C. due to temperature rise in the brazing and have a face-centered cubic structure at brazing temperatures (around 1100° C.)

As a result, the present invention can (1) prevent joining failure due to disconnection of a brazing filler, (2) prevent blocking of product flow paths due to brazing filler clogging of gaps between fine parts, (3) reduce a usage amount of a brazing material, and (4) reduce product cost by using an inexpensive low-carbon steel to provide highly mass productive products.

As the second aspect of the invention, in the case where the structure body is given by joining the plate 3 made from a ferrite-based stainless steel and the inner fin 10 made from a carbon steel with a nickel brazing filler to form a heat exchanger, it becomes possible to perform, with good operability, nickel brazing of a fin made from a low-carbon steel that is inexpensive and has high thermal conductivity to a flow path made from a ferrite-based stainless steel, and an inexpensive and high-performance heat exchanger, which has high corrosion resistance due to the ferrite-based stainless steel for one of fluids and has high thermal conductivity due to the fin made from the low-carbon steel for the other fluid, can be obtained. Moreover, since the joining is possible with a small amount of brazing material, there is no risk of clogging of an inner fin due to the stay of an excessive brazing filler, to give heat exchangers with stable qualities.

As the third aspect of the invention, in the case where the heat exchanger is an oil cooler, and the cooler is of a multi-plate type in which the oil flow path 5 and the cooling water flow path 6 are arranged alternately, and the inner fin 10 is arranged to the oil flow path 5, the joining between the inner fin and the plate can be performed reliably. Furthermore, since the inner fin is arranged to the oil flow path, a problem of corrosion also does not occur. That is, an oil cooler free from the risk of corrosion can be provided.

DESCRIPTION OF EMBODIMENTS

Figure 1:
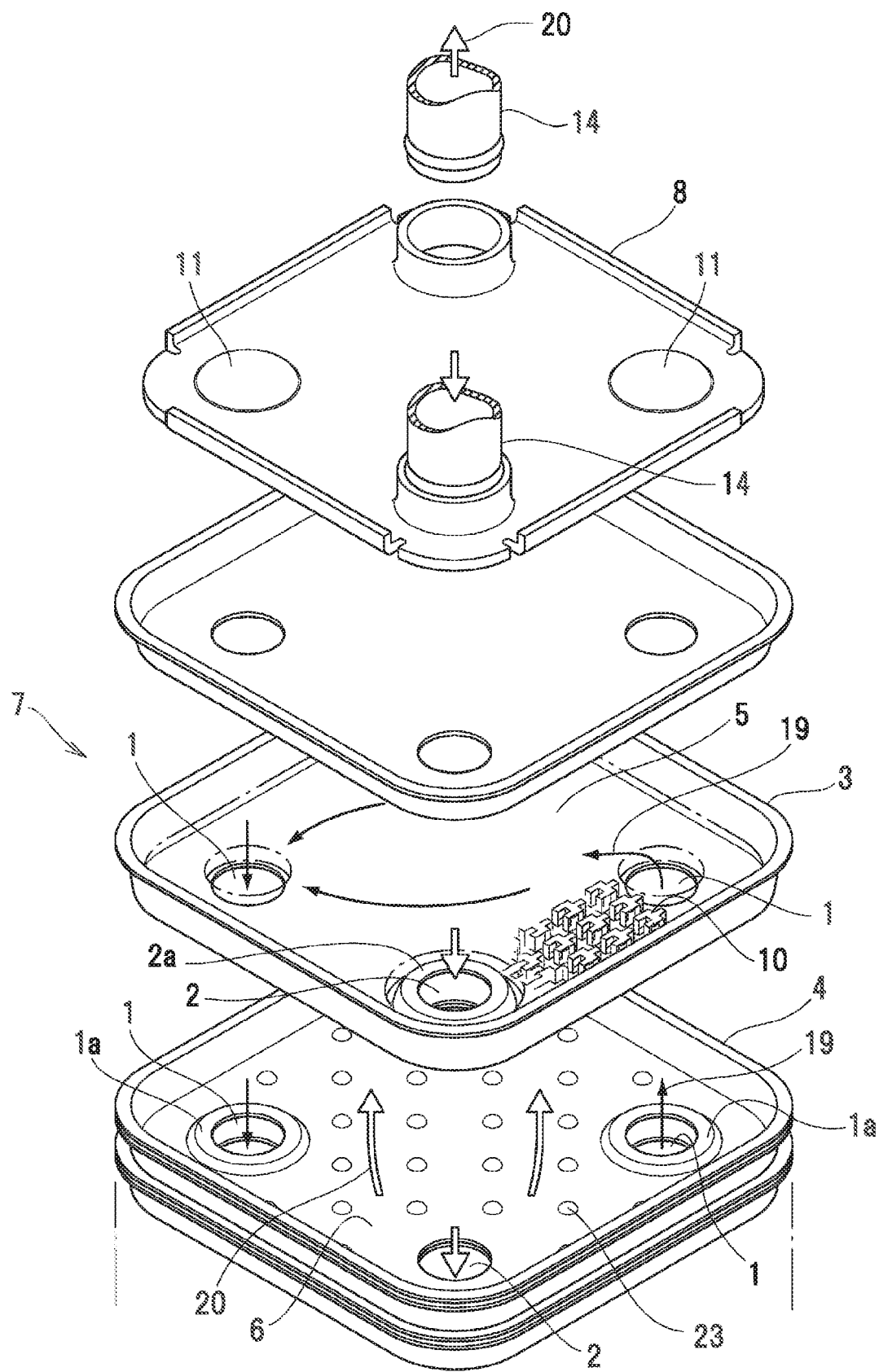
FIG. 1 illustrates an exploded perspective view of the oil cooler of the present invention.

Next, embodiments of the present invention will be explained on the basis of the drawings.

Note that the shape itself of this oil cooler belongs to the known technology disclosed as Japanese Patent Application Laid-Open Publication No. 2015-045427 (Patent Literature 1) by the present applicant. The present invention is characterized in the combination of the three, that is, the plate material, fin material and brazing material.

[Structure of Oil Cooler]

This oil cooler has a stacked body of a first plate 3 and a second plate 4 each made from a ferrite-based stainless steel, and an upper end plate 8 and a lower end plate 21 made from the similar material. Furthermore, the first plate 3 and the second plate 4 are stacked alternately to configure a core 7, an oil flow path 5 and a cooling water flow path 6 are formed for every other plate of both plates 4, 3, and the inner fin 10 made from a plate material of pure iron or carbon steel is arranged to the oil flow path 5.

These first plate 3 and the second plate 4 are made of those obtained by press-molding a cold-rolled steel plate in a dish shape. For the ferrite-based stainless steel plate, SUS430, SUS444, SUS445J1 and the like in Japanese Industrial Standards (JIS) can be used.

Moreover, as to a carbon steel plate configuring the inner fin 10, a corrugated fin and multi-entry type fin (offset fin) can be formed by bending, by press molding, a cold-rolled steel plate of SPCC, SPCD, SPCE, SPCF, SPCG or the like in JIS.

As one example, a component composition of the SPCC is: 0.15 mass % or less of carbon, 0.60% or less of manganese, 0.100% or less of phosphorus, and 0.035% or less of sulfur.

Further, a nickel brazing filler is used for a brazing material for joining the first plate 3 of a ferrite-based stainless steel and the inner fin 10 of a carbon steel. As the nickel brazing filler, for example, nickel brazing materials prescribed by standards such as JIS or AWS (American Welding Society) can be used.

While interposing such nickel brazing material between the first plate 3 and the inner fin 10, respective parts are brazed in a furnace. According to an experiment, in a combination of a plate of a ferrite-based stainless steel, inner fin of a carbon steel and a nickel brazing filler, the spread of the brazing material resulted in near six times the spread of a nickel brazing filler interposed between ferrite-based stainless steel plates.

Figure 2:
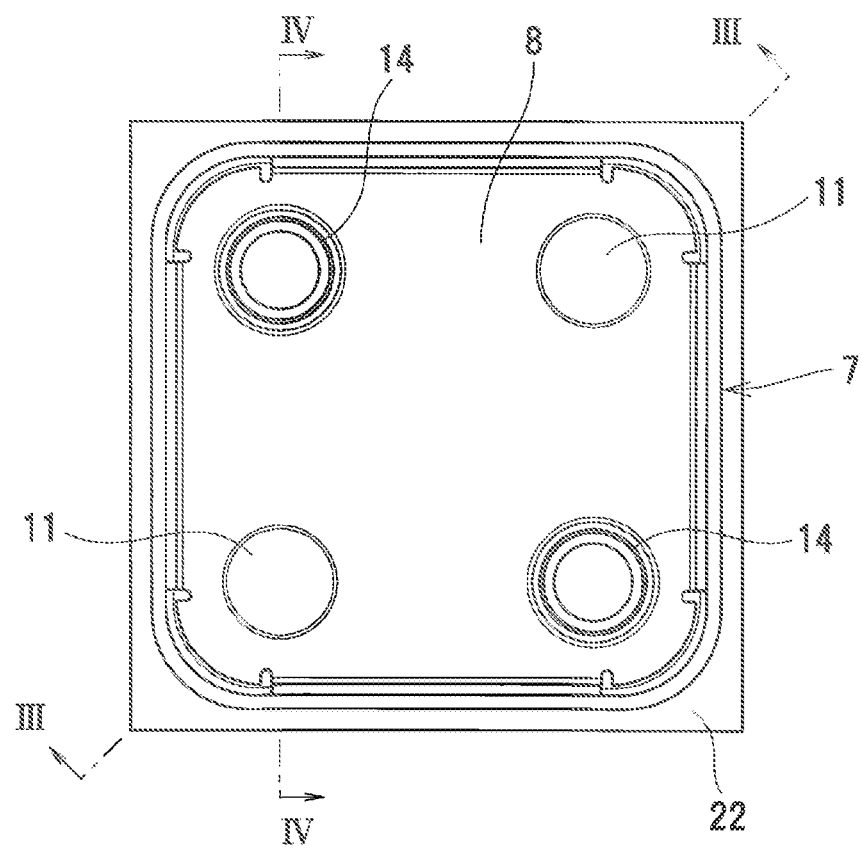
FIG. 2 illustrates a plan view of FIG. 1.
Figure 3:
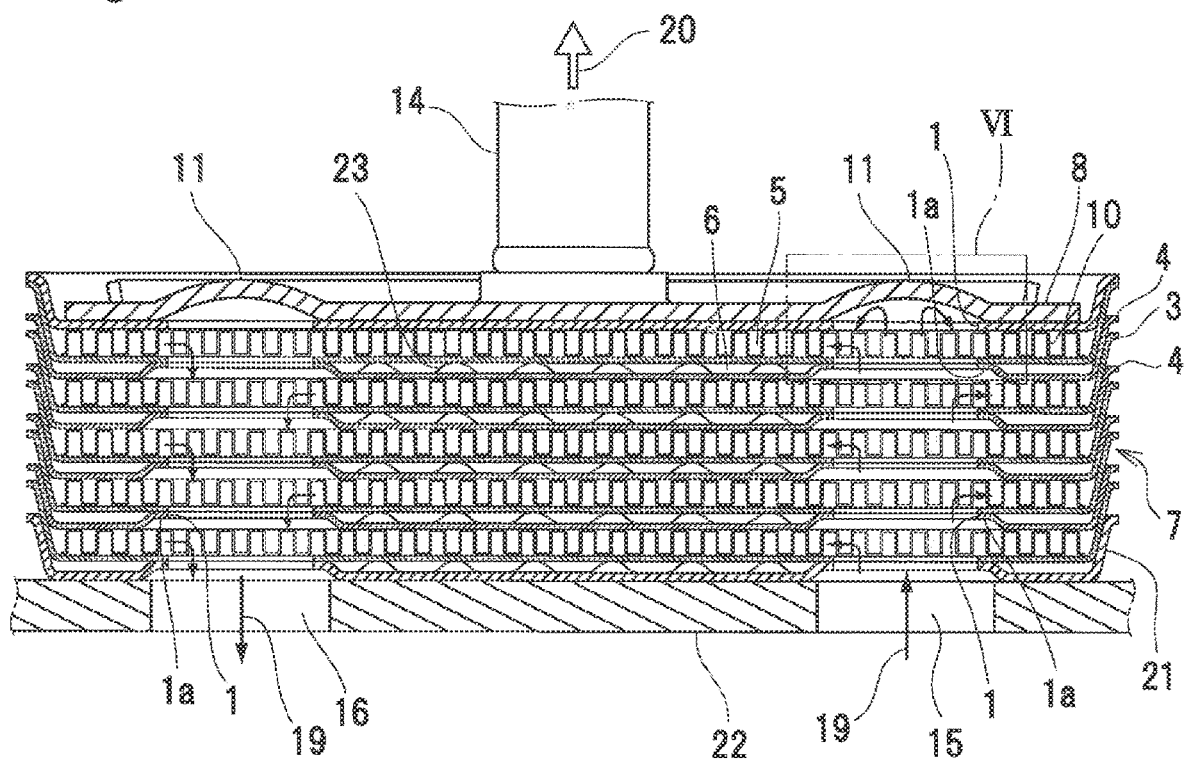
FIG. 3 illustrates a III-III-arrow seen cross-section view of FIG. 2.
Figure 4:
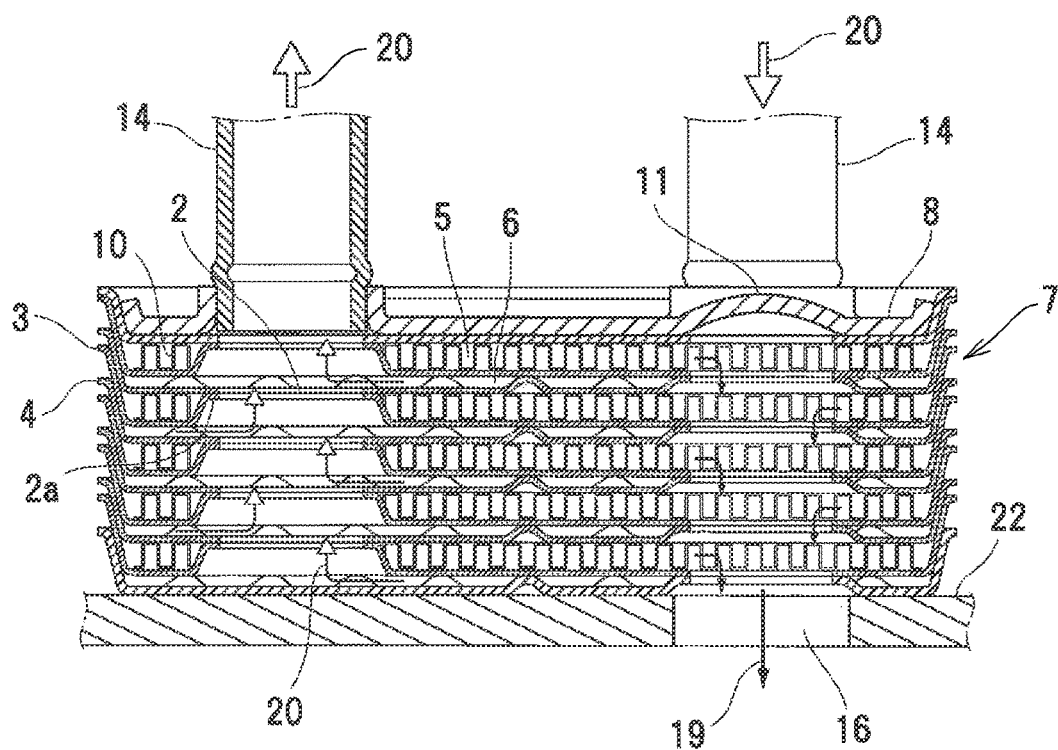
FIG. 4 illustrates a IV-IV-arrow seen cross-section view of FIG. 2.
Figure 5:
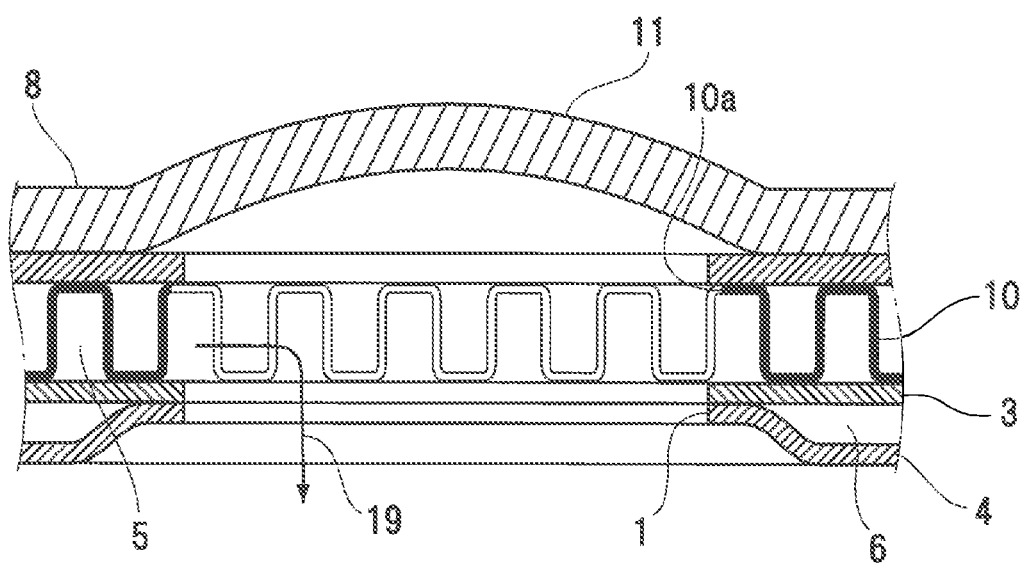
FIG. 5 illustrates a partially enlarged view of FIG. 4.

Meanwhile, FIG. 1 illustrates an exploded perspective view of the oil cooler of the present invention, FIG. 2 illustrates a plan view thereof, FIG. 3 illustrates a III-III-arrow seen cross-section view of FIG. 2, FIG. 4 illustrates a IV-IV-arrow seen cross-section view of FIG. 2, and FIG. 5 illustrates a partially enlarged view of FIG. 4. Furthermore, in respective first plates 3 that have a dish shape made from a ferrite-based stainless steel and are arranged every other plate, the bottom surface is formed flat and the oil flow path 5 is formed on the inside of the dish. On the inside of the second plate 4 similarly having a dish shape, the cooling water flow path 6 is formed and, on the inner surface thereof, many dimples 23 by press molding project toward the inner surface side and are arranged in a dispersed state.

Furthermore, to a respective pair of corner portions on a diagonal line of the even first plate 3, oil communicating holes 1 are respectively arranged, and in a pair of corner portions on the other diagonal line orthogonal thereto, annular evaginating portions 2a respectively project, to which a pair of cooling water communicating holes 2 are arranged. In the second plate 4 having many dimples 23, in positions on a diagonal line inverse to that in the first plate 3, an annular evaginating portion 1a and the oil communicating hole 1 are arranged to a pair of respective corner portions, and in positions on the diagonal line orthogonal thereto, a pair of cooling water communication holes 2 are formed. Furthermore, the oil communicating hole 1 in the first plate 3 and the oil communicating hole 1 in the second plate 4 are connected to each other. Moreover, the tip of many dimples 23 in the second plate 4 abuts on the bottom surface of the first plate 3.

In the inside of the first plate 3 and the inside of the second plate 4, which are stacked every other plate, the oil flow path 5 and the cooling water flow path 6 are formed alternately. In the oil flow path 5, the inner fin 10 is interposed, and in the cooling water flow path 6, the dimple 23 exists. Furthermore, the stacked body of the first plate 3, the second plate 4 and the inner fin 10 forms the core 7, and to each of plates 3, 4 and the inner fin 10, a powdery nickel brazing filler is applied via a binder. At this time, as to the inner fin 10, the nickel brazing filler is applied to both surfaces in the thickness direction thereof. To the upper end of the core 7, the upper end plate 8 is arranged, and to the lower end, the lower end plate 21 is arranged. Moreover, in both corners on the diagonal line of the upper end plate 8, a pair of convex portions 11 are arranged, projecting to the front surface side.

Such oil cooler formed of an assembly of the first plate 3, the second plate 4 and the inner fin 10 is brazed and fixed integrally in a furnace at high temperatures. Then spaces between peripheral edges of the first plate 3 and the second plate 4, and between these and the inner fin 10 are joined, and spaces between periphery edge portions of the first plate 3 and the second plate 4, and between the dimple 23 on the second plate 4 and the bottom surface of the first plate 3 are joined.

At this time, the brazing area in the oil flow path 5 is extremely large as compared with the brazing area of the cooling water flow path 6. The reason is that contact areas between the inner fin 10 and the first plate 3, the second plate 4 are large. Therefore, it is necessary to make the spread of the nickel brazing filler in the oil flow path 5 larger than that in the cooling water flow path 6. Since the inner fin 10 made from a carbon steel plate is arranged between the first plate 3 and the second plate 4 in the oil flow path 5, the spread of the nickel brazing filler becomes extremely larger than the spread in the cooling water flow path 6.

This oil cooler is arranged, as shown in FIGS. 3 and 4 as an example, on a base portion 22. Then cooling water 20 circulates from one pipe 14 to the other pipe 14 through respective cooling water flow paths 6. Moreover, oil 19 circulates from an oil inlet 15 in the base portion 22 into respective oil flow paths 5. Then a heat exchanger is performed between the cooling water 20 and the oil 19.

The characteristic of Example is that a ferrite-based stainless steel plate is used for plates 3, 4, low carbon steel such as SPCC is used for the inner fin 10, and both are joined with a nickel-based brazing material.

Consequently, even when a ferrite-based stainless steel plate is used as a plate, it becomes possible to provide a multi-plate oil cooler etc. that have high joining strength and are free from clogging and inexpensive, with a small usage amount of a nickel brazing filler.

Meanwhile, in respective drawings, a similar nickel brazing filler joins cooling water flow paths 6 lying between the first plate 3 and the second plate 4. Since a portion to be brazed between the first plate 3 and the second plate 4 in the cooling water flow path 6 is small, a small consumption amount of a nickel brazing filler will suffice.

Other Examples

In the above Example, both the first plate 3 and the second plate 4 are formed from a ferrite-based stainless steel plate. In place of it, it is also possible to set the first plate 3 alone to a ferrite-based stainless steel plate, and to set the second plate 4 to an austenite-based stainless steel plate. Even then, for the inner fin 10 of the oil flow path 5, a cold-rolled steel plate such as SPCC, SPCD, SPCE, SPCF or SPCG, which are carbon steel plates, is used. When an austenite-based stainless steel plate is used as a raw material of the second plate 4, the spread of a nickel brazing filler in brazing becomes large, even in the cooling water flow path 6.

Note that, needless to say, the present invention is not limited to above-described Examples of oil coolers, but may be utilized suitably for various multi-plate oil coolers, and additionally can be utilized for various heat exchangers such as heat exchangers for ventilation and heat sinks. Moreover, brazing may be performed in any of vacuum furnaces and furnaces of various atmospheres.

INDUSTRIAL APPLICABILITY

The present invention can be utilized for heat exchangers that are optimum for oil coolers, and can also be utilized for heat exchangers for ventilation and heat sinks.

REFERENCE SIGNS LIST 1 oil communicating hole
1a annular evaginating portion
2 cooling water communicating hole
2a annular evaginating portion
3 plate
4 plate
5 oil flow path
6 cooling water flow path
7 core
8 upper end plate
10 inner fin
10a inner fin hole
11 convex portion
14 pipe
15 oil inlet
16 oil outlet
19 oil
20 cooling water
21 lower end plate
22 base portion
23 dimple

The invention claimed is:
1. A multi-plate oil cooler having an oil flow path and a cooling water flow path arranged alternately and in which a ferrite-based stainless steel plate and an inner fin made from a carbon steel plate are joined with a nickel brazing filler and the inner fin is arranged in the oil flow path.

* * * * *